US011533856B2

(12) United States Patent
Sabic et al.

(10) Patent No.: US 11,533,856 B2
(45) Date of Patent: Dec. 27, 2022

(54) ELECTRIC POLE LOPPER

(71) Applicant: TECHTRONIC CORDLESS GP, Anderson, SC (US)

(72) Inventors: Adis Sabic, Kwai Chung (CN); Wong Kar Tat, Kwai Chung (CN); Li Da Zheng, Dongguan (CN); Zhang Sheng Rong, Dongguan (CN); Brian Ron Vines, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 17/009,357

(22) Filed: Sep. 1, 2020

(65) Prior Publication Data

US 2021/0068349 A1 Mar. 11, 2021

(30) Foreign Application Priority Data

Sep. 5, 2019 (CN) .......................... 201910837921.6

(51) Int. Cl.
*A01G 3/033* (2006.01)
*A01G 3/037* (2006.01)
*A01G 3/025* (2006.01)

(52) U.S. Cl.
CPC .......... *A01G 3/0335* (2013.01); *A01G 3/0255* (2013.01); *A01G 3/037* (2013.01)

(58) Field of Classification Search
CPC ...... A01G 3/037; A01G 3/0335; A01G 3/062; A01G 3/025; B26B 15/00; B25G 1/04; B25G 3/18
USPC .......................... 30/228, 296.1, 249, 180, 247
See application file for complete search history.

(56) References Cited

U.S. PATENT DOCUMENTS

| 5,002,135 A | 3/1991 | Pellenc |
| 8,434,234 B2* | 5/2013 | Chen ...................... A01G 3/037 30/228 |
| 9,179,605 B2* | 11/2015 | Yamaoka ................ B26B 15/00 |

(Continued)

FOREIGN PATENT DOCUMENTS

| CN | 102907268 A | 2/2013 |
| CN | 205755767 U | * 12/2016 |

(Continued)

OTHER PUBLICATIONS

CN-205755767-U English Translation Yan Peng.*
European Search Report for EP Patent Application No. 20193986 dated Apr. 7, 2021; 3 pages.

*Primary Examiner* — Laura M Lee
(74) *Attorney, Agent, or Firm* — Dority & Manning, P.A.

(57) ABSTRACT

Electric pole loppers are provided. An electric pole lopper includes a handle, a connecting pole and a pruning component which are connected in sequence, wherein the pruning component comprises a casing, a control mechanism and, connected in sequence, a motive power mechanism, a drive mechanism and a cutter set, wherein the motive power mechanism and the drive mechanism are disposed in the casing, the cutter set is disposed at that end of the casing which is remote from the motive power mechanism, a switch connected to the motive power mechanism is provided on the handle, and the control mechanism is connected to the drive mechanism; the drive mechanism is a worm gear/worm drive mechanism or a ball screw drive mechanism.

20 Claims, 7 Drawing Sheets

(56) References Cited

U.S. PATENT DOCUMENTS

| | | | | |
|---|---|---|---|---|
| 2004/0031156 | A1* | 2/2004 | Linden | A01G 3/08 30/249 |
| 2008/0173138 | A1* | 7/2008 | Dayton | A01G 3/053 30/500 |
| 2011/0061242 | A1* | 3/2011 | Chen | B26B 15/00 30/228 |
| 2011/0107606 | A1* | 5/2011 | Shan | A01G 3/0255 30/249 |
| 2011/0185579 | A1 | 8/2011 | Pellenc | |
| 2011/0258859 | A1* | 10/2011 | Schofield | A01G 3/037 30/228 |
| 2012/0167396 | A1* | 7/2012 | Wu | A01G 3/0255 30/249 |
| 2013/0055575 | A1 | 3/2013 | Delmas | |
| 2015/0113810 | A1* | 4/2015 | Zurcher | F16H 25/2021 30/228 |
| 2019/0357444 | A1* | 11/2019 | Lin | A01G 3/085 |

FOREIGN PATENT DOCUMENTS

| | | | | |
|---|---|---|---|---|
| CN | 205755767 U | | 12/2016 | |
| CN | 205865245 U | * | 1/2017 | A01G 3/037 |
| CN | 205865245 U | | 1/2017 | |
| EP | 2353366 A1 | * | 8/2011 | A01G 3/037 |
| EP | 2853148 A1 | | 4/2015 | |
| EP | 3000313 A1 | | 3/2016 | |
| FR | 2585612 A | * | 2/1987 | B26B 15/00 |
| JP | 2007195469 A | | 8/2007 | |
| WO | WO2008023705 A1 | | 2/2008 | |

\* cited by examiner

ELECTRIC POLE LOPPER

This application claims the benefit of priority to Chinese Patent Application No. 201910837921.6, filed on Sep. 5, 2019, the disclosure of which is incorporated by reference herein in its entirety.

TECHNICAL FIELD

The present invention relates to the technical field of outdoor tools, in particular to an electric lopper.

BACKGROUND ART

A lopper is an outdoor tool that is commonly used for pruning all kinds of bushes and branches, etc., in gardens. Electric loppers are widely used on account of such characteristics as being lightweight, convenient to operate, safe and reliable.

Existing electric loppers generally comprise a cutter set, wherein a lower cutter is fixed, and an upper cutter reciprocates up and down under the driving action of a drive means, in order to prune bushes and branches, etc. However, in existing electric loppers, the drive means generally employs a bevel gear drive; in the process of transmission, vibration and noise levels are high, and operation is not smooth.

SUMMARY OF THE INVENTION

The object of the present invention is to provide an electric lopper, for the purpose of increasing the smoothness of transmission in the electric lopper and reducing pruning noise from the electric lopper.

To achieve the abovementioned object, the present invention provides an electric lopper, comprising a handle, a connecting pole and a pruning component which are connected in sequence, wherein the pruning component comprises a casing, a control mechanism and, connected in sequence, a motive power mechanism, a drive mechanism and a cutter set, wherein the motive power mechanism and the drive mechanism are disposed in the casing, the cutter set is disposed at that end of the casing which is remote from the motive power mechanism, a switch connected to the motive power mechanism is provided on the handle, and the control mechanism is connected to the drive mechanism; the drive mechanism is a worm gear/worm drive mechanism or a ball screw drive mechanism.

Optionally, a worm in the worm gear/worm drive mechanism is connected to the motive power mechanism, and a small gear is provided on the worm gear, the small gear transmitting motive power concentrically with the worm gear; the small gear is meshed with an upper cutter in the cutter set, and a lower cutter in the cutter set is connected to the upper cutter and fixed to the casing.

Further optionally, the upper cutter comprises a toothed tail part and an upper cutting head which are connected to each other, wherein the toothed tail part is meshed with the small gear.

Further optionally, the toothed tail part is of lower hardness than the upper cutting head.

Optionally, the toothed tail part, the upper cutting head and the lower cutter are connected together by means of a threaded connecting member.

Further optionally, the threaded connecting member is a stepped connecting member, comprising a cylindrical threaded end, a cylindrical middle segment, a square prism and a cuboid end which are connected in sequence, wherein the cylindrical threaded end is arranged coaxially with the cylindrical middle segment, and the cylindrical threaded end has a smaller diameter than the cylindrical middle segment; the circle centre of a cross section of the cylindrical middle segment, the centre point of a square cross section of the square prism and the centre point of the cuboid end are all coincident; moreover, the area of the cross section of the cylindrical middle segment is less than the area of the square cross section of the square prism, and the area of the square cross section of the square prism is less than the area of that side of the cuboid end which is connected to the square prism; the toothed tail part and the upper cutting head are provided with round through-holes fitting the cylindrical middle segment, the lower cutter and the casing are provided with square through-holes fitting the square prism, and the casing is provided with a rectangular recess fitting the cuboid end, the square through-hole in the casing being disposed in the rectangular recess; starting at the cuboid end, the stepped connecting member passes through the casing, the lower cutter, the upper cutting head and the toothed tail part in sequence; the cylindrical threaded end passes through the toothed tail part and is connected to a nut.

Optionally, the control mechanism comprises a fixed pin disposed on the worm gear and, mounted on the casing, a direction change switch and a stop switch; the fixed pin touches the direction change switch as the worm gear rotates, the worm gear rotates in the opposite direction, the worm gear touches the stop switch while rotating in the opposite direction, and the worm gear stops rotating.

Optionally, the ball screw drive mechanism comprises a screw and a screw nut mounted on the screw, the screw being connected to the motive power mechanism, the screw nut being connected to an upper cutter in the cutter set, and a lower cutter in the cutter set being connected to the upper cutter and fixed to the casing.

Further optionally, the screw nut is connected to the upper cutter by means of a forked connecting member.

Further optionally, the forked connecting member is an integrally stamped forked connecting member.

Further optionally, the forked connecting member is connected to the screw nut by means of a countersunk screw.

Further optionally, two ends of the forked connecting member that are connected to the screw nut are arc-shaped ends.

Further optionally, a sealing ring is provided between the forked connecting member and the casing.

Optionally, the control mechanism comprises a Hall sensor connected to the screw nut, movement of the screw nut being controlled by means of the Hall sensor.

Optionally, the motive power mechanism comprises a DC motor and a planetary gear speed reducer, with an input end of the planetary gear speed reducer being connected to an output end of the DC motor, and an output end of the planetary gear speed reducer being connected to the drive mechanism.

Optionally, a power supply means supplying power to the DC motor is provided in the handle.

Optionally, the connecting pole is a telescopic connecting pole.

Optionally, the pruning component is connected to the connecting pole rotatably.

Further optionally, the pruning component is connected to the connecting pole rotatably by means of a rotary button; the rotary button is a T-shaped button, a boss is provided along a side face of an upper end of the T-shaped button, and multiple protrusions are provided uniformly on the boss; an inside face, connected to the upper end, of the connecting pole is provided with multiple slots fitting the protrusions; and a mounting platform, provided with a slot fitting a lower end of the T-shaped button, is provided in the casing.

Further optionally, the T-shaped button further comprises a spring, which passes through the lower end and is mounted between an inside face of the upper end and the mounting platform.

Optionally, the cutter set comprises at least one cutter made of at least two different materials.

Further optionally, the at least one cutter comprises a connecting part made of a first material and a cutting part made of a second material.

Further optionally, a characteristic thereof is that the first material is of lower hardness than the second material.

Optionally, the cutter set comprises a visibility enhancing feature.

Further optionally, the visibility enhancing feature is selected from at least one of luminous features, highly reflective features, fluorescent features, brightly coloured features and pattern features.

Further optionally, the visibility enhancing feature is provided on an outside surface of at least one cutter in the cutter set.

Having adopted the solution described above, the present invention has the following beneficial effects:

The electric lopper provided in the present invention comprises a handle, a connecting pole and a pruning component which are connected in sequence, wherein the pruning component comprises a casing and, connected in sequence, a control mechanism, a motive power mechanism, a drive mechanism and a cutter set, wherein the motive power mechanism and the drive mechanism are disposed in the casing, the cutter set is disposed at that end of the casing which is remote from the motive power mechanism, a switch connected to the control mechanism is provided on the handle, and the drive mechanism is a worm gear/worm drive mechanism or a ball screw drive mechanism. By using the worm gear/worm drive mechanism or ball screw drive mechanism to replace an existing bevel gear drive mechanism, it is possible not only to reduce noise during transmission but also to effectively improve the smoothness of transmission, thus greatly improving the performance of the electric lopper.

DETAILED DESCRIPTION OF THE INVENTION

The present invention is expounded below in accordance with the embodiments shown in the drawings. The embodiments disclosed on this occasion may be regarded as being non-limiting examples in all respects. The scope of the present invention is not limited by the explanation of the embodiments below, being indicated by the scope of the claims alone, and includes all variants that fall within the scope of the claims and have the same meaning as the scope of the claims.

The electric lopper provided in the present invention is expounded below in conjunction with particular embodiments.

Figure 1:
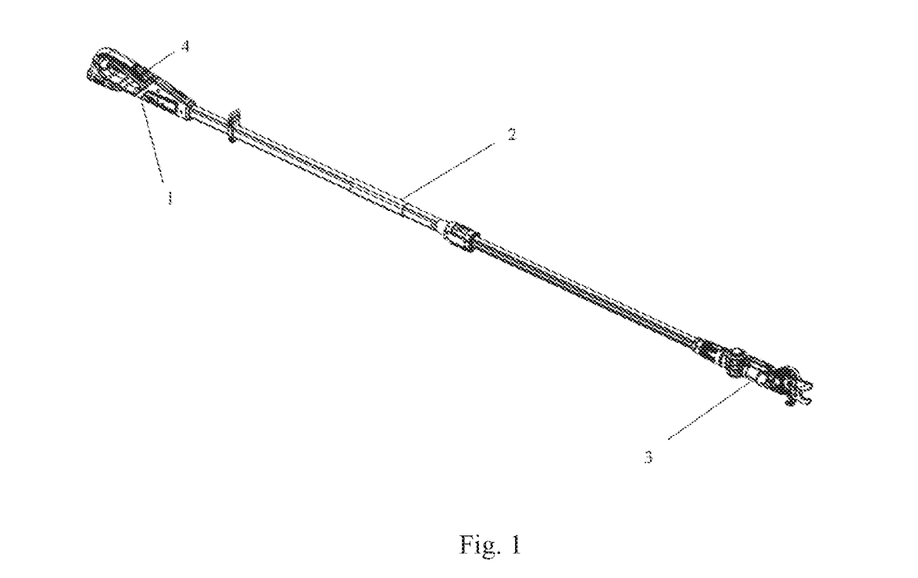
FIG. 1 is a structural schematic drawing of a first electric lopper provided in an embodiment of the present invention.
Figure 2:
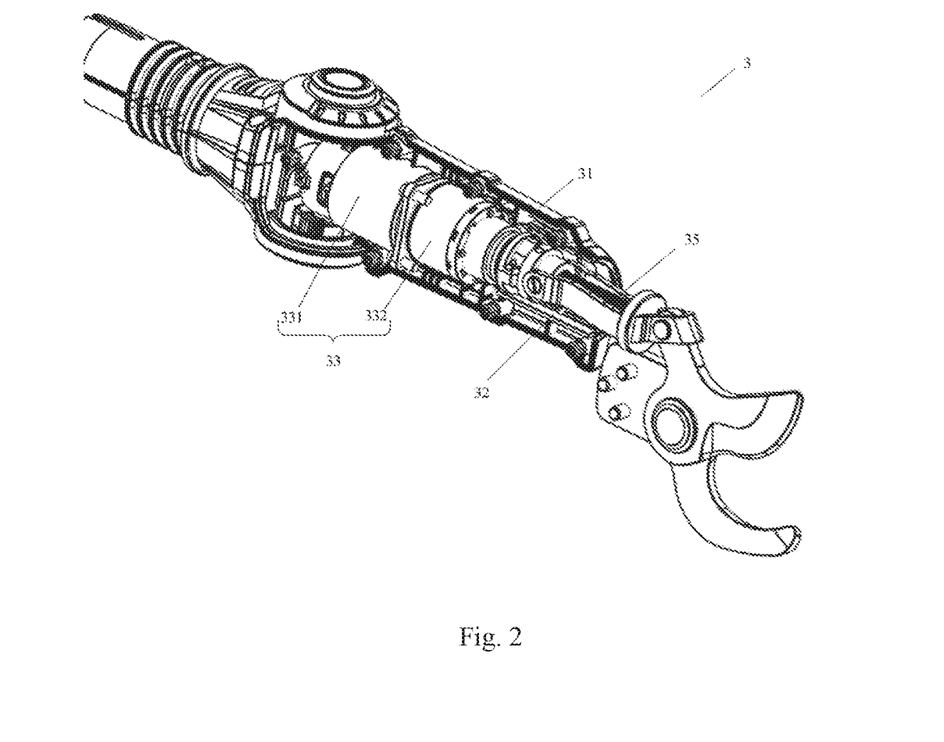
FIG. 2 is a structural schematic drawing of a second electric lopper provided in an embodiment of the present invention.
Figure 3:
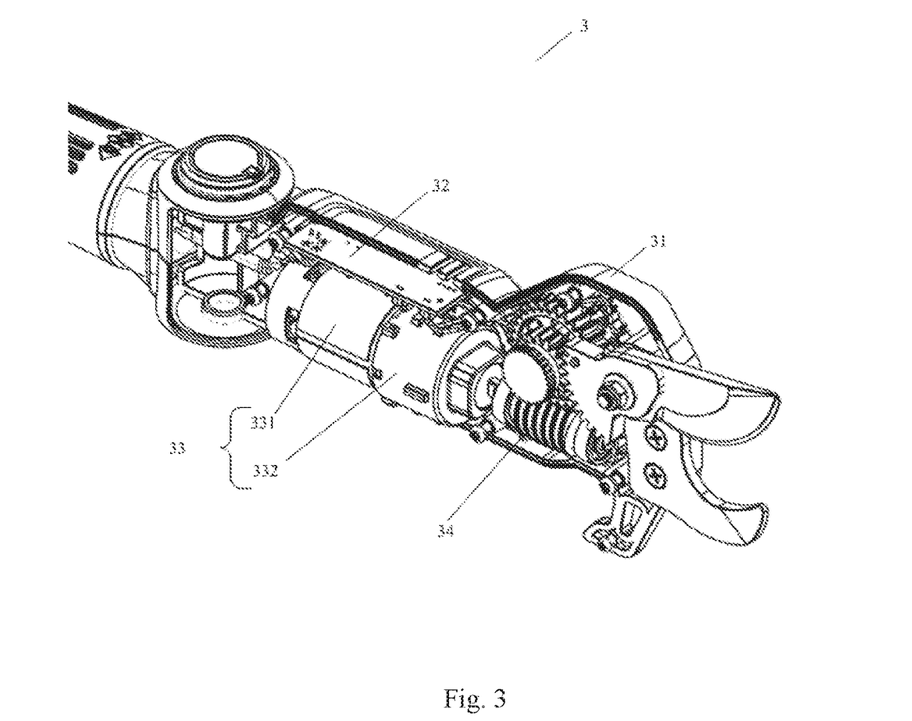
FIG. 3 is a partial structural schematic drawing of the first electric lopper provided in an embodiment of the present invention.

As shown in FIGS. 1-3, the embodiments of the present invention provide an electric lopper, the electric lopper comprising a handle 1, a connecting pole 2 and a pruning component 3 which are connected in sequence. Specifically, the pruning component 3 comprises a casing 31, a control mechanism 32 and, connected in sequence, a motive power mechanism 33, a drive mechanism and a cutter set, wherein the motive power mechanism 33 and drive mechanism are disposed in the casing 31, the cutter set is disposed at that end of the casing 31 which is remote from the motive power mechanism 33, a switch 4 connected to the motive power mechanism 33 is provided on the handle 1, and the control mechanism is connected to the drive mechanism; the drive mechanism is a worm gear/worm drive mechanism 34 or a ball screw drive mechanism 35.

In the process of using the electric lopper to prune bushes or branches, etc., the switch 4 on the handle 1 is pressed, the motive power mechanism 33 is activated by means of the switch 4, and the motive power mechanism 33 transmits motive power to the worm gear/worm drive mechanism 34 or ball screw drive mechanism 35 connected thereto, thus activating the electric lopper, while travel control is achieved by means of the control mechanism 32 connected to the drive mechanism.

In the electric lopper provided in this embodiment, the drive mechanism is the worm gear/worm drive mechanism 34 or ball screw drive mechanism 35; by using the worm gear/worm drive mechanism 34 or ball screw drive mechanism 35 to replace an existing bevel gear drive mechanism, it is possible not only to reduce noise during transmission but also to effectively increase the smoothness of transmission, thus greatly improving the performance of the electric lopper.

Figure 4:
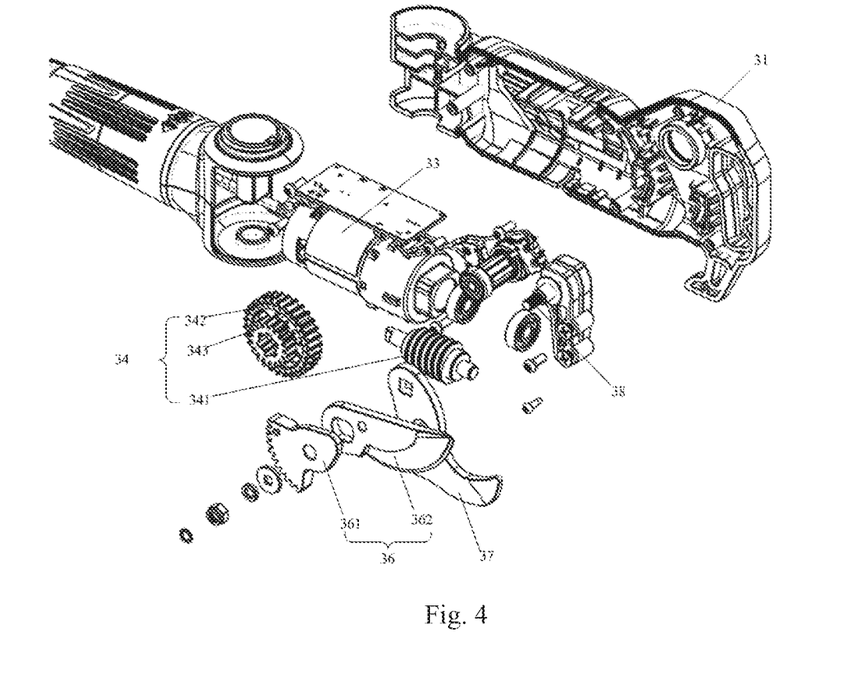
FIG. 4 is a first partial exploded drawing of the first electric lopper provided in an embodiment of the present invention.

By way of demonstration, as shown in FIG. 4, the cutter set of the electric lopper may comprise at least one cutter made of at least two different materials.

Specifically, the at least one cutter may comprise a connecting part made of a first material and a cutting part made of a second material, and furthermore, the first material is of lower hardness than the second material, i.e. a second material of greater hardness is used to make the cutting part; thus, in the process of using the cutter to perform cutting, damage to the cutter due to stress concentration can be prevented while ensuring the cutting performance of the cutter, and also, separate replacement is possible when the cutting part or connecting part breaks, facilitating maintenance and reducing maintenance costs. In addition, since the first material used to make the connecting part is of lower hardness, the wear experienced by a drive structure driving the connecting part to move can be effectively reduced, increasing the lifespan of the drive structure and thus increasing the service life of the electric lopper.

By way of demonstration, as shown in FIG. 4, in an embodiment of the present invention, the electric lopper employs a worm gear/worm drive; specifically, a worm 341 in the worm gear/worm drive mechanism 34 is connected to the motive power mechanism 33, and a small gear 343 is provided on a worm gear 342 in the worm drive mechanism 34, the small gear transmitting motive power concentrically with the worm gear 342; the small gear 343 is meshed with an upper cutter 36 in the cutter set, and a lower cutter 37 in the cutter set is connected to the upper cutter 36 and fixed to the casing 31.

Specifically, when the electric lopper employs the worm gear/worm drive mechanism 34, motive power outputted by the motive power mechanism 33 drives the worm 341 to rotate, and the small gear 343 on the worm gear 342 meshed with the worm 341 rotates with the worm gear 342, driving the upper cutter 36 meshed with the small gear to reciprocate up and down, cooperating with the lower cutter 37 to prune bushes, etc.

By way of demonstration, the upper cutter 36 comprises a toothed tail part 361 and an upper cutting head 362 which are connected to each other, wherein the toothed tail part 361 is meshed with the small gear 343. [0042] Specifically, motive power outputted by the motive power mechanism 33 drives the worm 341 to rotate, and the small gear 343 on the worm gear 342 meshed with the worm 341 rotates with the worm gear 342, and by means of the toothed tail part 361 meshed with the small gear, drives the upper cutting head 362 connected to the toothed tail part to reciprocate up and down, cooperating with the lower cutter 37 to prune bushes, etc.

Specifically, the toothed tail part 361 is of lower hardness than the upper cutting head 362.

The small gear 343 is generally of lower hardness than the upper cutter 36 used for cutting, and consequently, in the process of using the electric lopper, the small gear 343 experiences severe wear, with the result that the lifespan of the electric lopper is short. In this embodiment, the upper cutter 36 is divided into two parts: the upper cutting head 362 for pruning bushes and branches, etc., is of greater hardness, while the toothed tail part 361 used for transmission is of lower hardness, making it possible to effectively reduce wear to the small gear 343 due to friction of meshing with the tail part of the upper cutter 36, increasing the lifespan of the small gear 343, and thus increasing the service life of the electric lopper; in addition, by dividing the upper cutter 36 into two parts, it is possible to prevent cutter damage due to stress concentration, and also, separate replacement is possible when the toothed tail part 361 or upper cutting head 362 breaks, facilitating maintenance and reducing maintenance costs.

Figure 5:
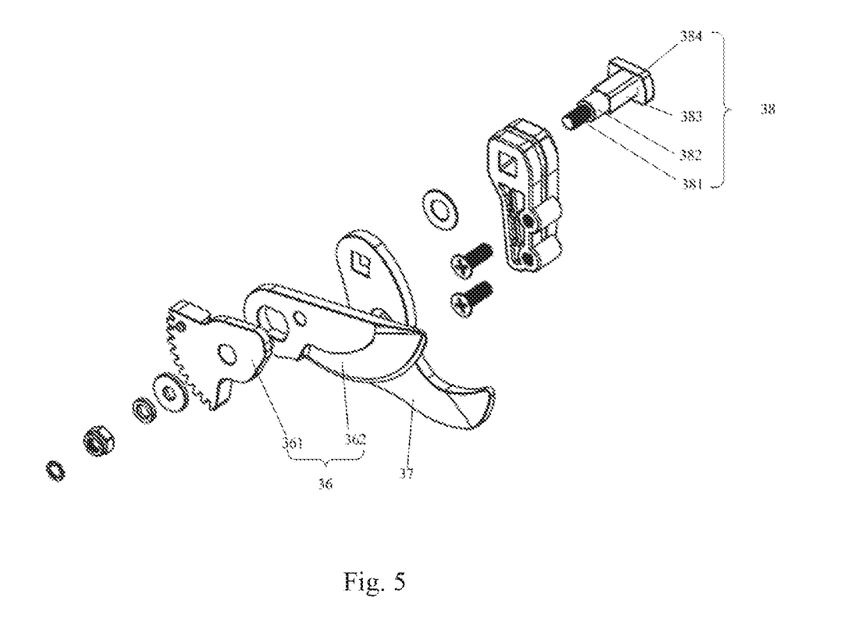
FIG. 5 is a second partial exploded drawing of the first electric lopper provided in an embodiment of the present invention.

By way of demonstration, as shown in FIG. 4, the toothed tail part 361, upper cutting head 362 and lower cutter 37 are connected together by means of a threaded connecting member 38. Specifically, as shown in FIG. 5, the threaded connecting member 38 is a stepped connecting member, comprising a cylindrical threaded end 381, a cylindrical middle segment 382, a square prism 383 and a cuboid end 384 which are connected in sequence. The cylindrical threaded end 381 is arranged coaxially with the cylindrical middle segment 382, and the cylindrical threaded end 381 has a smaller diameter than the cylindrical middle segment 382; the circle centre of a cross section of the cylindrical middle segment 382, the centre point of a square cross section of the square prism 383 and the centre point of the cuboid end 384 are all coincident; moreover, the area of the cross section of the cylindrical middle segment 382 is less than the area of the square cross section of the square prism 383, and the area of the square cross section of the square prism 383 is less than the area of that side of the cuboid end 384 which is connected to the square prism 383.

The toothed tail part 361 and upper cutting head 362 are provided with round through-holes fitting the cylindrical middle segment 382, the lower cutter 37 and casing 31 are provided with square through-holes fitting the square prism 383, and the casing 31 is provided with a rectangular recess fitting the cuboid end 384, the square through-hole in the casing 31 being disposed in the rectangular recess.

Starting at the cuboid end 384, the stepped connecting member passes through the casing 31, lower cutter 37, upper cutting head 362 and toothed tail part 361 in sequence; the cylindrical threaded end 381 passes through the toothed tail part 361 and is connected to a nut.

Figure 6:
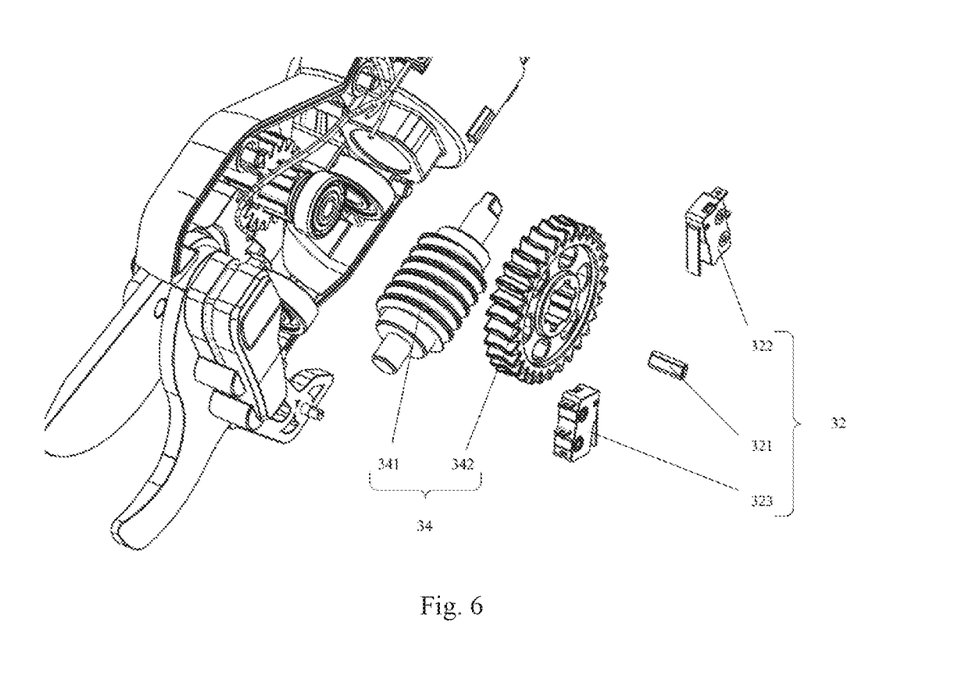
FIG. 6 is a third partial exploded drawing of the first electric lopper provided in an embodiment of the present invention

Optionally, as shown in FIG. 6, the control mechanism 32 comprises a fixed pin 321 disposed on the worm gear 342 and, mounted on the casing 31, a direction change switch 322 and a stop switch 323. Specifically, the fixed pin 321 touches the direction change switch 322 as the worm gear 342 rotates, the worm gear 342 rotates in the opposite direction, the fixed pin 321 touches the stop switch 323 while rotating in the opposite direction, and the worm gear 342 stops rotating.

Figure 7:
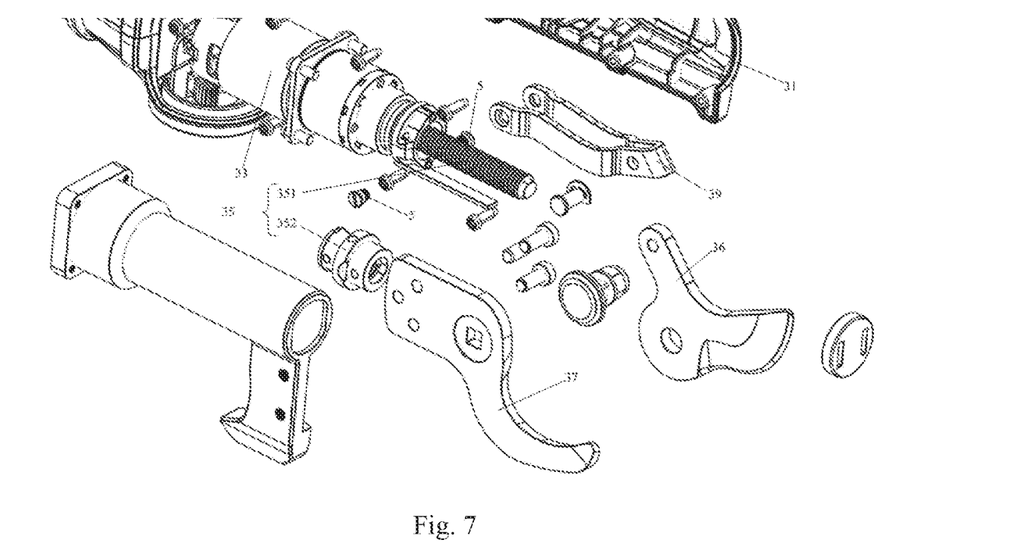
FIG. 7 is a first partial exploded drawing of the second electric lopper provided in an embodiment of the present invention.

By way of demonstration, as shown in FIGS. 2 and 7, in another embodiment of the present invention, the electric lopper employs a ball screw drive; specifically, the ball screw drive mechanism 35 comprises a screw 351 and a screw nut 352 mounted on the screw 351, the screw 351 being connected to the motive power mechanism 33, the screw nut 352 being connected to an upper cutter 36 in the cutter set, and a lower cutter 37 in the cutter set being connected to the upper cutter 36 and fixed to the casing 31.

Specifically, when the electric lopper employs the ball screw drive mechanism 35, motive power outputted by the motive power mechanism 33 is converted from rotational motion to linear motion via the screw 351 and screw nut 352, driving the screw nut 352 to reciprocate, and thus driving the upper cutter 36 connected to the screw nut 352 to reciprocate, cooperating with the lower cutter 37 to prune bushes, etc.

By way of demonstration, as shown in FIGS. 7-10, the screw nut 352 is connected to the upper cutter 36 by means of a forked connecting member 39. The forked connecting member 39 provided in embodiments of the present invention is always one component, with strong integrity, and good structural strength, and being simple to fit, and can be made by stamping a sheet, at a low cost.

Figure 10:
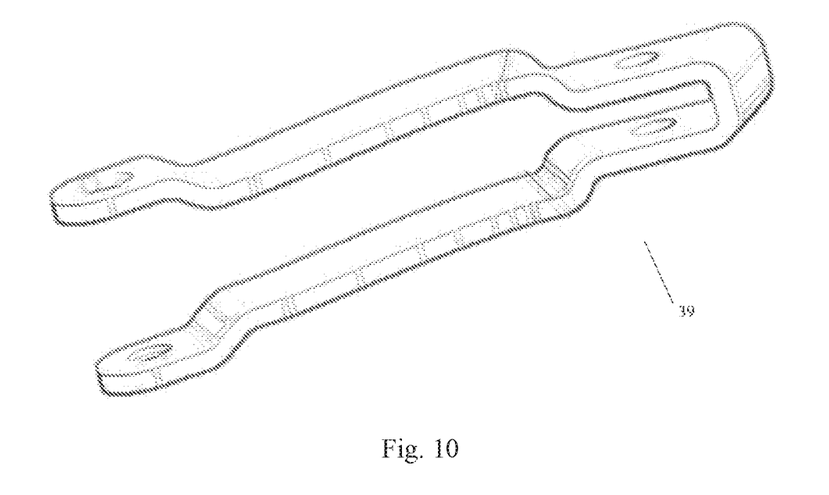
FIG. 10 is a structural schematic drawing of a second forked connecting member provided in an embodiment of the present invention.

Further optionally, as shown in FIG. 10, the forked connecting member 39 is an integrally stamped forked connecting member, which does not require any welding and has better structural strength and load-bearing ability; where installation space allows, the forked connecting member 39 shown in FIG. 10 may preferably be used.

Figure 8:
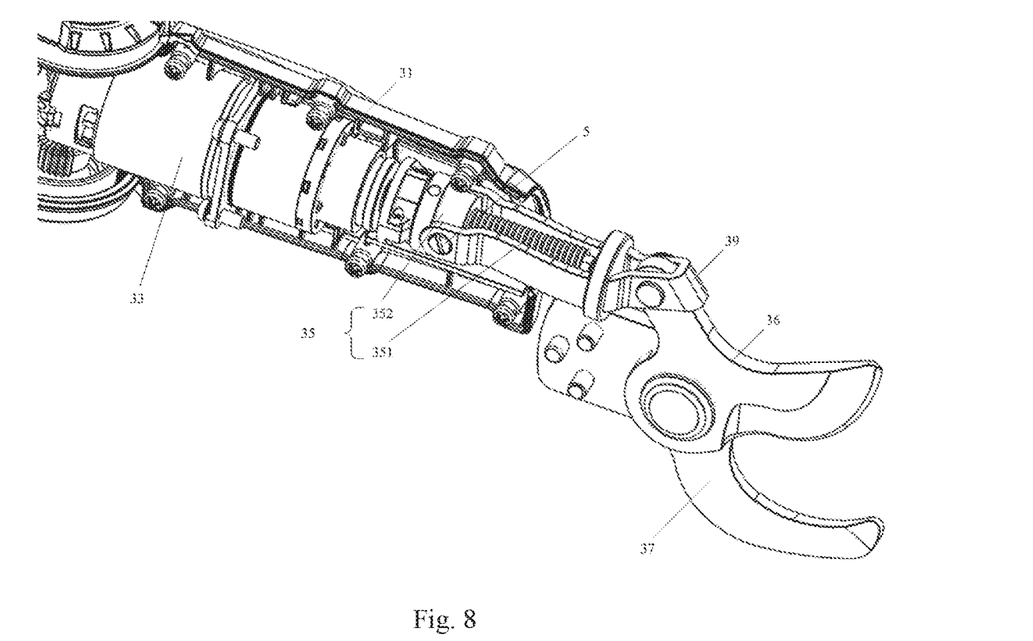
FIG. 8 is a first partial structural schematic drawing of the second electric lopper provided in an embodiment of the present invention.
Figure 9:
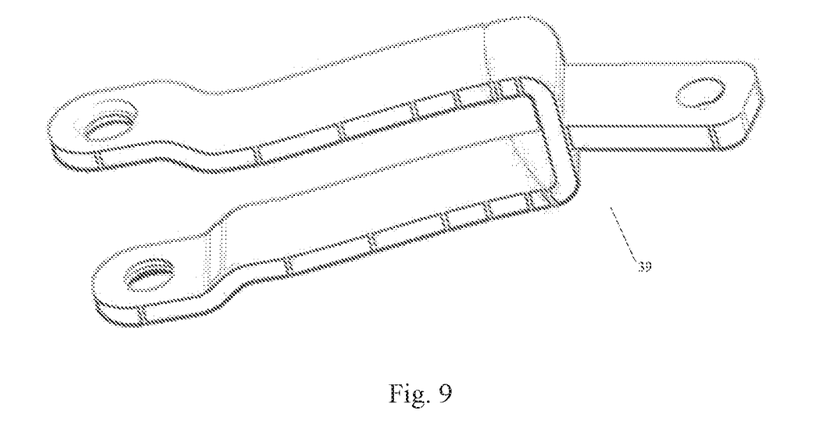
FIG. 9 is a structural schematic drawing of a first forked connecting member provided in an embodiment of the present invention.

In addition, as shown in FIG. 8, the forked connecting member 39 is connected to the screw nut 352 by means of countersunk screws 5; thus, the forked connecting member 39 can be effectively prevented from opening outwards when subjected to a force, and furthermore, when the upper cutter 36 completes one action of cutting and return, the countersunk screws 5 can bear the pulling force of the forked connecting member 39, increasing the stability of the electric lopper structure.

It should be added that, as shown in FIG. 8, two ends of the forked connecting member 39 that are connected to the screw nut 352 are arc-shaped ends; thus, an arc fit can be realized between the forked connecting member 39 and the screw nut 352, and when the electric lopper is cutting, the screw nut 352 can bear a greater pushing force, preventing the countersunk screws 5 from being pushed to destruction; moreover, relative rotation of the forked connecting member 39 around the centre of the arc is also possible, so the forked connecting member 39 will not be locked up.

By way of demonstration, a sealing ring may also be provided between the forked connecting member 39 and the casing 31, to prevent the ingress of impurities and dust, etc., into the casing 31 from the surroundings, and consequent damage to the electric lopper.

Figure 11:
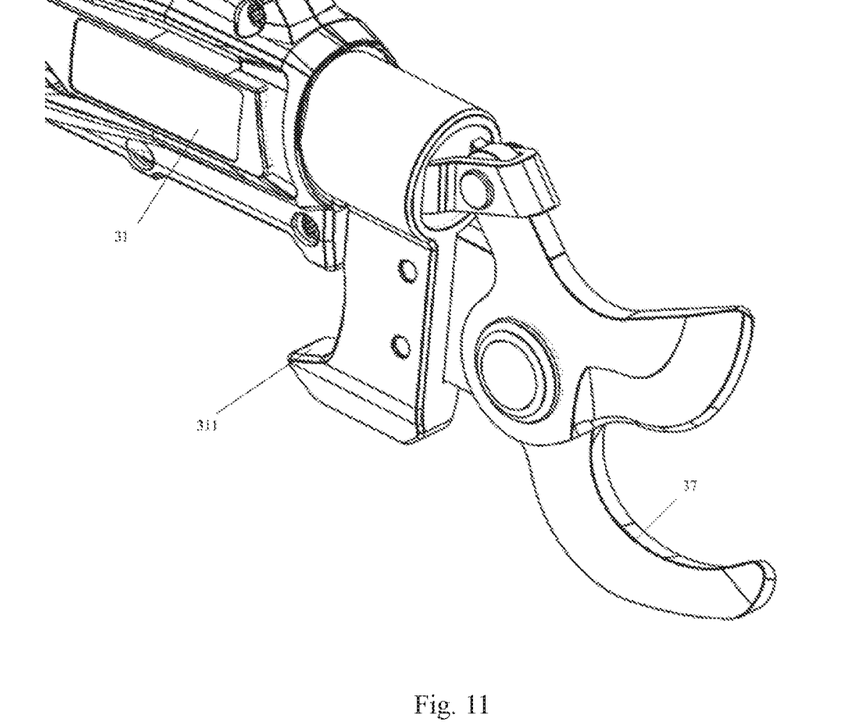
FIG. 11 is a second partial structural schematic drawing of the second electric lopper provided in an embodiment of the present invention.

In addition, as shown in FIG. 11, at the position where the lower cutter 37 is connected to the casing 31, the casing 31 is further provided with a hooked structure 311 facing away from the lower cutter 37; thus, the hooked structure can be used to hook off branches, etc., that have been cut, avoiding a situation where branches that have been cut become hung on other branches.

Optionally, in this embodiment, the control mechanism 32 may comprise a Hall sensor connected to the screw nut 352; movement of the screw nut 352 is controlled by means of the Hall sensor, thereby controlling the travel of the electric lopper.

The specific method and process of using the Hall sensor to control movement of the screw nut as described above are the same as the process and method of using a Hall sensor to control travel in the prior art; those skilled in the art may refer to the existing process and method of using a Hall sensor to control travel, and this is not described further in the embodiments of the present invention.

In addition, as shown in FIGS. 1, 2 and 3, in the two embodiments provided in the present invention that are described above, a visibility enhancing feature is provided for the cutter set, thus enabling a user to clearly distinguish the relative positions of the cutters and the plant to be pruned during use. In some embodiments, the visibility enhancing feature comprises various features that make the cutters easier for the user to see, such as luminous features, highly reflective features, fluorescent features, brightly coloured features and pattern features. The visibility enhancing feature may be provided to the cutter set in various ways. By way of demonstration, as shown in the figures, in some embodiments, an additional material coating may be applied to the cutter set. Preferably, the material coating is provided on an outside surface of at least one cutter in the cutter set. Further preferably, the material coating is provided on an outside surface of the lower cutter 37 in the cutter set. In some embodiments, an additional visibility enhancing component may be provided for the cutter set, the visibility enhancing component being attached to one of the cutters in the cutter set. The visibility enhancing component has the abovementioned visibility enhancing feature.

Furthermore, in the two embodiments provided in the present invention that are described above, the motive power mechanism 33 may in each case comprise a DC motor 331 and a planetary gear speed reducer 332, with an input end of the planetary gear speed reducer 332 being connected to an output end of the DC motor 331, and an output end of the planetary gear speed reducer 332 being connected to the drive mechanism. Specifically, the output end of the planetary gear speed reducer 332 is connected to the worm 341, or the output end of the planetary gear speed reducer 332 is connected to the screw 351, and motive power outputted by the DC motor 331 is transmitted to the worm gear/worm drive mechanism 34 or ball screw drive mechanism 35 after speed reduction by the planetary gear speed reducer 332.

Optionally, a power supply means supplying power to the DC motor 331 is provided in the handle 1. The DC motor 331 may be a brushless DC motor or a lower-cost brushed DC motor; the embodiments of the present invention do not impose any restriction in this respect.

Figure 12:
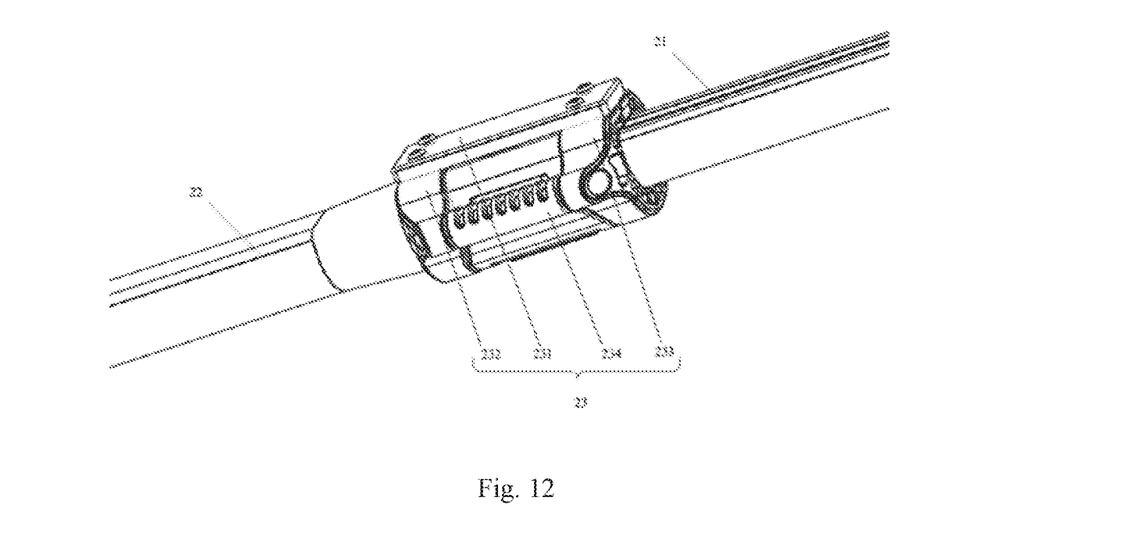
FIG. 12 is a partial structural schematic drawing of a connecting pole provided in an embodiment of the present invention.

Optionally, as shown in FIG. 12, the connecting pole 2 may be a telescopic connecting pole.

By way of demonstration, in one embodiment, as shown in FIG. 12, the connecting pole 2 may comprise an inner tube 21, an outer tube 22, and a locking means 23 fitted round the outer tube 22. The locking means 23 comprises a base 231, a first locking sleeve 232 fitted round the outer tube 22 in a fixed manner, a second locking sleeve 233 fitted round the inner tube 21 in a slideable manner, and a locking lever 234 mounted on the first locking sleeve 232 and second locking sleeve 233. By way of demonstration, when the user turns the locking lever 234 to a released position from a locked position in which it is tightly against the first locking sleeve 232 and second locking sleeve 233, the pressure applied to the outer tube 22 by the first locking sleeve 232 is reduced, and the inner tube 21 can slide freely; the user can pull out or push in the inner tube 21 by a certain distance as required, and then turn the locking lever 234 from the released position to the locked position, to realize length adjustment of the connecting pole 2.

By way of demonstration, in another embodiment, the connecting pole 2 may comprise an inner tube, an outer tube, and a sleeve connected to the inner tube and outer tube; an inner surface of the sleeve that is connected to the outer tube, and an end outer surface of the outer tube that is connected to the sleeve, are provided with threads which mate with each other. After releasing the sleeve by turning, the user can freely slide the inner tube in the outer tube, pull out or push in the inner tube by a certain distance as required, and then tighten the sleeve by turning, to realize length adjustment of the connecting pole 2.

Of course, those skilled in the art may also carry out design with reference to telescopic poles in the prior art; the embodiments of the present invention do not impose any restriction in this respect.

Figure 13:
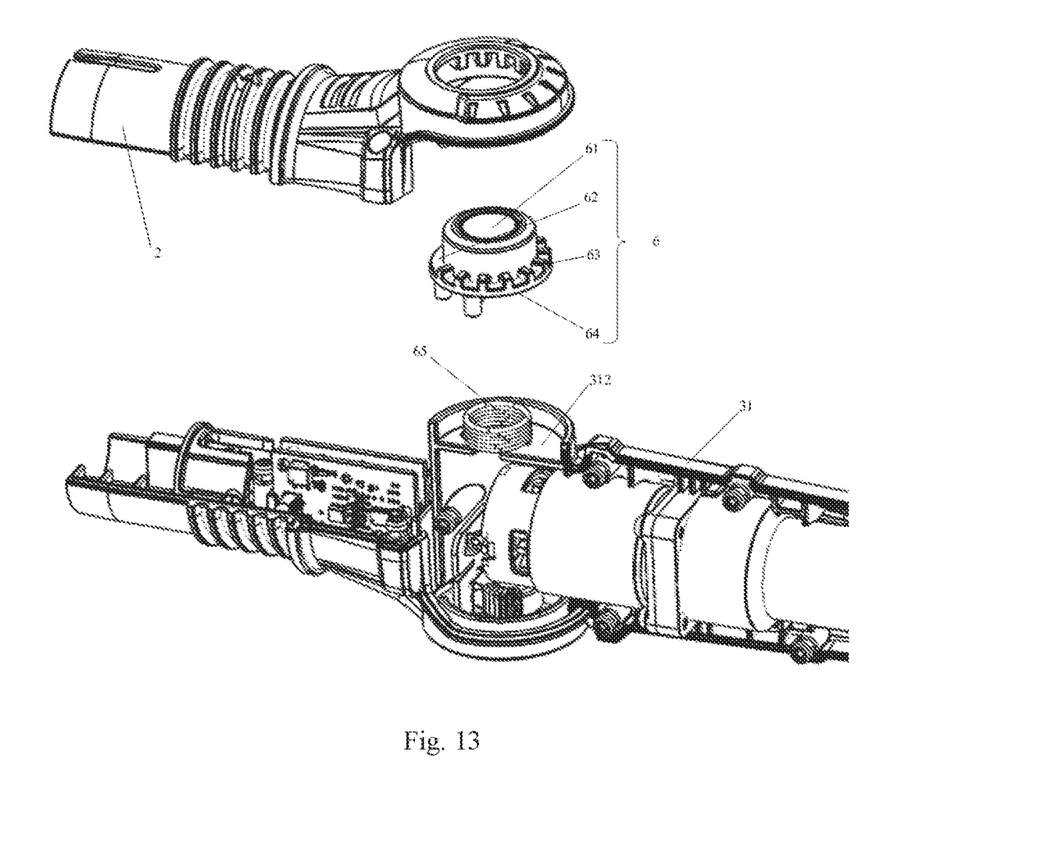
FIG. 13 is a fourth partial exploded drawing of the first electric lopper provided in an embodiment of the present invention.

Optionally, as shown in FIG. 13, the pruning component 3 is connected to the connecting pole 2 rotatably.

Further optionally, as shown in FIG. 13, the pruning component 3 is connected to the connecting pole 2 rotatably by means of a rotary button 6. Specifically, the rotary button is a T-shaped button, a boss 62 is provided along a side face of an upper end 61 of the T-shaped button, and multiple protrusions 63 are provided uniformly on the boss 62; an inside face, connected to the upper end 61 of the T-shaped button, of the connecting pole 2 is provided with multiple slots fitting the protrusions 63; and a mounting platform 312, provided with a slot fitting a lower end 64 of the T-shaped button, is provided in the casing 31.

By way of demonstration, when it is necessary to turn the pruning component 3, the user presses the rotary button 6, and the protrusions 63 of the upper end 61 of the rotary button 6 will then disengage from the slots of the inside face, connected to the upper end 61 of the T-shaped button, of the connecting pole 2; at the same time, the lower end 64 remains mated with the mounting platform 312, and the rotary button 6 is fixed relative to the pruning component 3 but moveable relative to the connecting pole 2, so the pruning component 3 can be turned.

In addition, as shown in FIG. 13, the T-shaped button further comprises a spring 65, which passes through the lower end 64 and is mounted between an inside face of the upper end 61 and the mounting platform 312. When the pruning component 3 is turned to the desired angle, the T-shaped button can be released; the spring 65 will automatically push up the T-shaped button, and the protrusions 63 will engage in the slots in the inside face, connected to the upper end 61 of the T-shaped button, of the connecting pole 2, locking the current angle of the pruning component 3.

Those skilled in the art, after considering this description and implementing the invention disclosed herein, will readily think of other embodiments of the present invention. The present application is intended to cover any variants, uses or adaptive modifications of the present invention; these variants, uses or adaptive modifications comply with the general principles of the present invention and include undisclosed common knowledge or customary technical methods in the art. The description and embodiments are regarded as being demonstrative only; the true scope and spirit of the present invention are indicated by the claims.

It should be understood that the present invention is not limited to the embodiment methods and structures already described above and the precise structures shown in the drawings, and can be amended and changed in various ways without departing from the scope thereof. The scope of the present invention is limited only by the attached claims.

What is claimed is:

1. An electric lopper comprising:
    a handle, a connecting pole and a pruning component which are connected in sequence, wherein the pruning component comprises a casing, a control mechanism and, connected in sequence, a motive power mechanism, a drive mechanism and a cutter set, wherein the motive power mechanism and the drive mechanism are disposed in the casing, the cutter set is disposed at that end of the casing which is remote from the motive power mechanism, a switch connected to the motive power mechanism is provided on the handle, and the control mechanism is connected to the drive mechanism;
    wherein the drive mechanism is a worm gear/worm drive mechanism or a ball screw drive mechanism;
    wherein the cutter set comprises an upper cutter and a lower cutter,
    wherein the upper cutter is coupled to the lower cutter via a threaded connecting member, the threaded connecting member including a stepped connecting member, comprising a cylindrical threaded end, a cylindrical middle segment, a square prism and a cuboid end which are connected in sequence, wherein the cylindrical threaded end is arranged coaxially with the cylindrical middle segment, and the cylindrical threaded end has a smaller diameter than the cylindrical middle segment; wherein the circle centre of a cross section of the cylindrical middle segment, the centre point of a square cross section of the square prism and the centre point of the cuboid end are all coincident; wherein the area of the cross section of the cylindrical middle segment is less than the area of the square cross section of the square prism, and the area of the square cross section of the square prism is less than the area of that side of the cuboid end which is connected to the square prism;
    wherein the upper cutter comprises a toothed tail part and an upper cutting head, wherein the toothed tail part and the upper cutting head are provided with round through-holes fitting the cylindrical middle segment, the lower cutter and the casing are provided with square through-holes fitting the square prism, and the casing is provided with a rectangular recess fitting the cuboid end, the square through-hole in the casing being disposed in the rectangular recess; and
    wherein, starting at the cuboid end, the stepped connecting member passes through the casing, the lower cutter, the upper cutting head and the toothed tail part in sequence; the cylindrical threaded end passes through the toothed tail part and is connected to a nut.

2. The electric lopper of claim 1, wherein the motive power mechanism comprises a DC motor and a planetary gear speed reducer, with an input end of the planetary gear speed reducer being connected to an output end of the DC motor, and an output end of the planetary gear speed reducer being connected to the drive mechanism.

3. The electric lopper of claim 2, wherein a power supply supplying power to the DC motor is provided in the handle.

4. The electric lopper of claim 1, wherein the ball screw drive mechanism comprises a screw and a screw nut mounted on the screw, the screw being connected to the motive power mechanism, the screw nut being connected to an upper cutter in the cutter set, and a lower cutter in the cutter set being connected to the upper cutter and fixed to the casing.

5. The electric lopper of claim 4, wherein the screw nut is connected to the upper cutter by means of a forked connecting member.

6. The electric lopper of claim 5, wherein the forked connecting member is an integrally stamped forked connecting member.

7. The electric lopper of claim 5, wherein the forked connecting member is connected to the screw nut by means of a countersunk screw.

8. The electric lopper of claim 5, wherein two ends of the forked connecting member that are connected to the screw nut are arc-shaped ends.

9. The electric lopper of claim 5, wherein a sealing ring is provided between the forked connecting member and the casing.

10. The electric lopper of claim 4, wherein the control mechanism comprises a Hall sensor connected to the screw nut, movement of the screw nut being controlled by means of the Hall sensor.

11. The electric lopper of claim 1, wherein the toothed tail part is of lower hardness than the upper cutting head.

12. The electric lopper of claim 1, wherein the toothed tail part and the upper cutting head comprise separate parts.

13. An electric lopper comprising:
    a handle;

a connecting pole; and a pruning component, wherein the handle, connecting pole, and pruning component are connected in sequence, wherein the pruning component comprises a casing, a control mechanism and, connected in sequence, a motive power mechanism, a drive mechanism and a cutter set, wherein the motive power mechanism and the drive mechanism are disposed in the casing, wherein the cutter set is disposed at that end of the casing which is remote from the motive power mechanism, wherein the handle comprises a switch connected to the motive power mechanism, wherein the control mechanism is connected to the drive mechanism, wherein the drive mechanism is a worm gear/worm drive mechanism or a ball screw drive mechanism, wherein the cutter set comprises an upper cutter and a lower cutter, wherein the upper cutter comprises a toothed tail part and an upper cutting head formed from separate parts and coupled together, wherein the upper cutter is coupled to the lower cutter via a threaded connecting member, wherein the threaded connecting member is a stepped connecting member, comprising a cylindrical threaded end, a cylindrical middle segment, a square prism and a cuboid end which are connected in sequence, wherein the cylindrical threaded end is arranged coaxially with the cylindrical middle segment, and the cylindrical threaded end has a smaller diameter than the cylindrical middle segment; wherein the circle centre of a cross section of the cylindrical middle segment, the centre point of a square cross section of the square prism and the centre point of the cuboid end are all coincident; wherein the area of the cross section of the cylindrical middle segment is less than the area of the square cross section of the square prism, and the area of the square cross section of the square prism is less than the area of that side of the cuboid end which is connected to the square prism, wherein the toothed tail part and the upper cutting head are provided with round through-holes fitting the cylindrical middle segment, the lower cutter and the casing are provided with square through-holes fitting the square prism, and the casing is provided with a rectangular recess fitting the cuboid end, the square through-hole in the casing being disposed in the rectangular recess, and wherein, starting at the cuboid end, the stepped connecting member passes through the casing, the lower cutter, the upper cutting head and the toothed tail part in sequence; the cylindrical threaded end passes through the toothed tail part and is connected to a nut.

14. The electric lopper of claim 13, wherein the motive power mechanism comprises a DC motor and a planetary gear speed reducer, with an input end of the planetary gear speed reducer being connected to an output end of the DC motor, and an output end of the planetary gear speed reducer being connected to the drive mechanism.

15. The electric lopper of claim 14, wherein a power supply supplying power to the DC motor is provided in the handle.

16. The electric lopper of claim 13, wherein the ball screw drive mechanism comprises a screw and a screw nut mounted on the screw, the screw being connected to the motive power mechanism, the screw nut being connected to an upper cutter in the cutter set, and a lower cutter in the cutter set being connected to the upper cutter and fixed to the casing.

17. The electric lopper of claim 16, wherein the screw nut is connected to the upper cutter by means of a forked connecting member.

18. The electric lopper of claim 17, wherein the forked connecting member is an integrally stamped forked connecting member.

19. The electric lopper of claim 17, wherein the forked connecting member is connected to the screw nut by means of a countersunk screw.

20. The electric lopper of claim 17, wherein two ends of the forked connecting member that are connected to the screw nut are arc-shaped ends.

* * * * *